(12) United States Patent
Charles (10) Patent No.: US 10,517,164 B1
(45) Date of Patent: Dec. 24, 2019

(54) UNIVERSAL PHASE CONTROL DIMMER FOR WIRELESS LIGHTING CONTROL

(71) Applicant: RAB Lighting Inc., Northvale, NJ (US)

(72) Inventor: Yves Charles, Northvale, NJ (US)

(73) Assignee: RAB Lighting Inc., Northvale, NJ (US)

( * ) Notice: Subject to any disclaimer, the term of this patent is extended or adjusted under 35 U.S.C. 154(b) by 0 days.

(21) Appl. No.: 16/408,089

(22) Filed: May 9, 2019

(51) Int. Cl.
H05B 37/02 (2006.01)
H02M 1/08 (2006.01)

(52) U.S. Cl.
CPC ........ *H05B 37/0272* (2013.01); *H02M 1/083* (2013.01)

(58) Field of Classification Search
CPC   H05B 33/083; H05B 33/0845; H05B 33/089; H05B 33/0809; H05B 33/0815; H05B 33/0827; H05B 33/0857; H05B 37/0209; H05B 39/086; H05B 41/3924; H05B 41/3927; H05B 41/40; H05B 33/0812; H05B 39/04; H05B 39/085
USPC ...................... 315/291, 122, 185 R, 193, 362
See application file for complete search history.

(56) References Cited

U.S. PATENT DOCUMENTS

| | | | |
|---|---|---|---|
| 6,813,720 B2 | 11/2004 | Leblanc | |
| 7,345,860 B2 | 3/2008 | Wong | |
| 7,532,956 B1 | 5/2009 | Pelaez, Jr. et al. | |
| 7,652,472 B2 | 1/2010 | Kobayashi et al. | |
| 7,969,100 B2 | 6/2011 | Xu et al. | |
| 8,085,160 B2 | 12/2011 | Vanderzon | |
| 8,310,166 B2 | 11/2012 | Nagaoka | |
| 8,653,750 B2 | 2/2014 | Deurenberg et al. | |
| 8,698,466 B2 | 4/2014 | Vanderzon | |
| 9,025,287 B2 | 5/2015 | Privitera et al. | |
| 9,369,116 B2 | 6/2016 | Nederbragt et al. | |
| 9,419,435 B2 | 8/2016 | Testani | |
| 9,438,122 B2 | 9/2016 | Mao et al. | |
| 9,801,247 B2 | 10/2017 | Hayashi et al. | |
| 2008/0246414 A1* | 10/2008 | Xu | H05B 39/048 315/291 |

(Continued)

FOREIGN PATENT DOCUMENTS

| | | |
|---|---|---|
| EP | 0923274 | 6/1999 |
| WO | 2017080394 | 5/2017 |
| WO | 2017089341 | 6/2017 |

*Primary Examiner* — Wei (Victor) Y Chan
(74) *Attorney, Agent, or Firm* — Frost Brown Todd LLC; Dennis S. Schell; Kevin C. Oschman (57) ABSTRACT

Embodiments of the present disclosure provide multi-mode phase control dimmers for lighting devices, particularly for use with wireless lighting control systems. The disclosed universal dimming devices include a load-type detection circuit for determining whether the load for connected lighting devices has an inductive characteristic. The system automatically detects the load characteristic and self-adjusts its phase-cut dimming mode in response. The disclosed solutions require minimal additional components to provide load-type detection beyond those components already included in typical phase dimming applications, particularly in a wireless lighting control environment, thereby minimizing cost. The disclosed solutions have improved reliability by detecting multiple characteristics detected for each of a plurality of AC cycles in order to reliably distinguish between load types.

14 Claims, 7 Drawing Sheets

(56) References Cited

U.S. PATENT DOCUMENTS

2012/0208382 A1 8/2012 Magari et al.
2017/0019975 A1 1/2017 Rawal et al.

\* cited by examiner

UNIVERSAL PHASE CONTROL DIMMER FOR WIRELESS LIGHTING CONTROL

TECHNICAL FIELD

Embodiments of this disclosure relate generally to dimming controllers for lighting devices and more particularly to multi-mode phase dimming control for wireless lighting control systems.

BACKGROUND

Dimmers are generally used to regulate the illumination level output by a light source, e.g. a lamp or LED, by controlling the voltage, current, and/or power provided. Common dimming control solutions typically utilize either a 0-10V dimming, which provides a 0-10V direct current (DC) dim control signal to a power supply for the light source, or alternating current (AC) phase control, which varies the duty cycle of AC power supplied to a lighting device to provide a modified AC power signal. The lighting device receiving the modified AC power signal may be the light source directly, or a power supply providing regulated power to the light source. Commercial lighting applications requiring dimming most commonly use the 0-10V dimming control, while residential lighting most commonly uses AC phase control dimming. This disclosure relates to AC phase control dimming applications, particularly ensuring proper AC phase control mode compatible with the lighting device coupled to the phase dimmer, including adaptors for converting 0-10V dimming signals to control AC phase controlled lighting devices, and particularly to phase dimming applications associated with wireless lighting control systems.

AC phase control dimming, also commonly referred to as phase-cut dimming or simply—phase dimming, utilizes an power switching circuit, typically including a TRIAC, an SCR, or a pair of MOSFETs, to control the duty cycle of the AC power provided to the lighting device. Maximum power is provided to the light if the power switching circuit connecting the load to the power source is conducting on at all times, i.e., the switches conduct AC power throughout the entire phase or sinusoidal cycle of AC power. In this way the, the total available energy of the power source is transferred to the load.

To provide dimming, reduced power is provided to the lighting device by turning the switches off for a portion of each sinusoidal half-cycle (both positive and negative), thereby cutting off power to the lighting device for a portion of each half-cycle. A proportional amount of the power provided by each AC half-cycle is thereby effectively isolated from the lighting device, reducing the average energy provided to the lighting device, and dimming the light source. For example, if the switching circuit conducting each AC half-cycle is turned on or off half way through each AC half-cycle, then only one-half of the power will be transferred to the load, i.e. either the first half or the second half of each half-cycle. By adjusting the point in each phase half-cycle at which the power switching circuit either begins to conduct or stops conducting the AC power to the load, the overall effect in the case of a light source will be a smooth dimming action resulting in the control of the luminosity of the light source from off to fully on.

In some applications the phase-cut power signal is provided directly to the lamp. This is most commonly the case with incandescent lamps. In many other applications, the phase-cut power signal provides power to a power supply from which the lamp is powered. Type of lighting power supplies include ballasts, drivers, Electronic Low Voltage (ELV), and Magnetic Low Voltage (MLV). Phase dimming is available using more than one mode of phase-cut operation. The mode best suited for the application depends on the type of lighting device being powered and its compatibility with that particular mode.

Reverse Phase or Trailing Edge dimming is a phase dimming mode in which each half-cycle begins with the switching circuit conducting power to the lighting device and then the switching circuit is turned off, the phase is 'cut,' later in the half-cycle. Forward Phase or Leading Edge dimming is a phase dimming mode in which each half cycle begins with the switching circuit turned off and then the switch is turned on later in the half-cycle, providing power to the lighting device in the remaining portion of each half-cycle. Depending on the electrical characteristics of the type of load, one phase dimming mode may be preferred over the other.

For resistive loads, voltage and current remain in phase. For capacitive loads, voltage lags current. And for an inductive loads, current lags voltage. Incandescent lamps are generally a resistive load, and while either phase dimming mode works for resistive loads because voltage and current remain in phase, Reverse Phase dimming is typically preferred. ELV power supplies and power supplies for Compact Florescent Lamps (CFL) typically use solid state electronic switching and are generally a capacitive load best suited for Reverse Phase dimming in which power is conducted at the beginning of each half-cycle and to dim, the switching circuit cuts-off power conduction at some point in the half-cycle. Capacitive loads induce an inrush current spike when power is connected, so turning the switch on to provide power when voltage is crossing through zero minimizes the effect of such transient electrical characteristics upon the start of conduction by limiting the power available during the transient.

In contrast, MLV power supplies use a magnetic transformer and thus are an inductive load best suited for Forward Phase dimming in which power is cut-off at the end of each half-cycle, and the switching circuit turns power on at some point at or subsequent to the beginning of the half-cycle, depending on the desired dimming level. Inductive loads induce a voltage spike or "fly-back" and associated ringing when power is disconnected, so turning the switching circuit off when voltage is crossing through zero minimizes the effect of this transient electrical characteristics as compared to the characteristics of a fly-back occurring at a higher power transfer point in the AC half-cycle.

Some ringing may occur with an MLV load using either Reverse Phase or Forward Phase dimming; however, when an MLV power supply is used with Forward Phase dimming, the ringing and associated effects are minimized. Negative effects relating to inductive fly-back and ringing if the nonpreferred Reverse Phase dimming is used with an MLV power supply include instability leading to audible noise, over heating from high peak currents, visible lighting effects such as flicker, shimmer, or ripple, and dead travel over a range of dimmer adjustment.

Phase dimmers are typically available in at least three types: (1) dimmers having only one of the above modes of phase dimming; (2) dimmers provide a manually selectable mode of phase dimming; and (3) dimmers providing automatic detection of the type of load and setting of the preferred mode of phase dimming for that type of load. If the type of phase dimming to be used for a load is set by selecting a dimmer using the preferred mode of the dimmer for a load or by manually selecting the mode for a manually selectable phase dimmer, the mode of phase dimming required may be mistakenly mismatched for the given type of load connected during installation, resulting in faulty or unreliable dimming operation, including the negative effects discussed above. Therefore, a phase dimmer capable of automatically detecting load type and setting the preferred mode for the connected load is preferable.

Several prior art phase dimming solutions provide automatic load-type detection and automatic phase-mode setting, with each providing a different technical solution to the problem. Common to the prior solutions is that each seeks to detect undesirable electrical characteristics of an inductive load connected to the phase dimmer and to set the phase dimming mode accordingly.

Some prior art phase dimmers include a high pass filter to extract a ringing portion of the load signal subsequent to the switching off of AC power to the load. These prior art phase dimmers then either capture and hold the peak of the ringing signal for comparison to a reference threshold, or digitally sample and study various characteristics of the ringing signal to determine if it is indicative of an inductive load. If the captured peak exceeds a reference threshold, then the load is determined to be inductive and the Forward Phase dimming mode is selected. Another prior art solution uses power phase monitoring to determine the phase relationship of current and voltage when powering the load to determine if the current phase lags the voltage phase, indicating the likelihood of an inductive load. Yet another prior art solution requires a different switching circuit shut-off transient time for initial load-type detection than is used for ongoing dimming operation. Similarly, another one of the prior art solutions requires a particular dimming setting be used for load-type detection and yet another prior art solution requires a specially dimming profile be executed during load-type detection.

Various disadvantages are associated with the prior art phase dimming solutions for automatic load-type detection and phase-mode setting. In particular, each of these prior art solutions require complex, costly circuits that are typically used only for the purpose of load-type detection, then are not subsequently used for operation. Additionally, some of these prior art solutions are relatively slow, for example, requiring up to 500 milliseconds to reasonably reliably determine the load-type connected to the dimmer. Furthermore, some of these prior art solutions are susceptible to false positive detections of an inductive load. For example, when the peak of a transient signal is the only parameter measured, such a transient spike detected may be an artifact of something other than the load-type being inductive, which may produce a false positive from such a transient condition, including, for example, from AC line noise. Additionally, other load types other than inductive loads can produce switch-off ringing under particular circumstances or combinations, which may produce a false positive when the presence of a ringing signal is alone used to determine load-type.

As such, it was realized by the inventors of the current disclosure that improvements are needed to reliably and economically provide automatic load-type detection and phase-cut mode selection for lighting devices, including for phase-cut dimmers and for 0-10 V to phase-cut adaptors, and as used in wireless lighting control system applications.

SUMMARY

Embodiments of the present disclosure provide multimode phase control dimmers for lighting devices, particularly for use with wireless lighting control systems. The disclosed universal dimming devices include a load-type detection circuit for determining whether the load for connected lighting devices has an inductive characteristic. The system automatically detects the load characteristic and self-adjusts its phase-cut dimming mode in response. The disclosed solutions require minimal additional components to provide load-type detection beyond those components already included in typical phase dimming applications, particularly in a wireless lighting control environment, thereby minimizing cost. The disclosed solutions have improved reliability by detecting multiple characteristics detected for each of a plurality of AC cycles in order to reliably distinguish between load types.

In accordance with one embodiment of the present disclosure, a phase dimming device for converting an AC power signal to a phase-cut power signal for selectively powering a lighting device that may be inductive or non-inductive, comprising: a power switching circuit having an input node and an output node, the input node receiving the AC power signal, the power switching circuit having a conductive state for a first portion of each AC half-cycle in which the AC power signal is conducted to the output node, and the power switching circuit having a nonconductive state for a second portion of each AC half-cycle in which the AC power signal is not conducted to the output node, and the output node coupled to the lighting device, thereby coupling the resulting phase-cut power signal to the lighting device; a resistive voltage divider coupled across the input and output nodes of the power switching circuit, the resistive voltage divider having a sensing node providing a artifact signal formed by the difference between the AC power signal and the phase-cut power signal coupled to the lighting device, the artifact signal having a signal component characteristic of whether the lighting device is inductive or noninductive upon the power switching circuit changing from the conductive state to the nonconductive state; an amplifier circuit receiving the artifact signal and configured to provide an analog output signal at an amplifier output node based on an amplified difference between the artifact signal and the AC power signal, the amplified difference being dependent on the signal component characteristic of the lighting device and a gain of the amplifier circuit; and a control circuit having a digital input port coupled to the amplifier output node, the digital input port receiving the analog signal output and registering the analog output as a high or low digital input; and wherein: the control circuit is configured to count the number of low to high digital input transitions for each AC power signal half-cycles; and the control circuit is configured to determine the lighting device to be inductive if at least a preset plurality of low to high digital input transitions are counted for every one of at least a preset plurality of sequential AC power signal half-cycles. The control circuit can be configured to initially set the power switching circuit for Reverse Phase dimming, and reset the power switching circuit for Forward Phase dimming upon determining the lighting device to be inductive.

A gain of the amplifier circuit may be set to provide an analog output magnitude sufficient to register a low to high digital input transition from the signal component characteristic of the lighting device when the lighting device is inductive and to not register a low to high digital input transition from the signal component characteristic of the lighting device when the lighting device is non-inductive. The amplifier circuit can be configured as an inverting op amp.

In at least one embodiment, the preset plurality of low to high digital input transitions is equal to two and the preset plurality of sequential AC power signal half-cycles is equal to two. In at least one embodiment of the phase dimming device a user interface is coupled to the dimming control circuit for manual control of the dimming level of the lighting device. In another embodiment of the phase dimmer device the control circuit is configured to receive a 0-10V dimming command signal and set the dimming level for the power switching circuit proportional to the dimming command signal.

At least one embodiment of the phase dimmer device includes a radio transceiver for communicating with a wireless lighting control system and the dimming control circuit can be a microcontroller providing communication with the radio transceiver and responsive to dimming commands received from the wireless lighting control system. Optionally, a user interface can be coupled to the microcontroller for manual control of the dimming level of the lighting device. The microcontroller may report to the wireless lighting control system whether the lighting device is determined to be inductive or non-inductive.

In accordance with another embodiment according to the present disclosure, a method of determining whether a lighting device coupled to a phase dimming device is inductive on noninductive, comprises the acts of: setting the phase dimming device to a mode that, when dimming, switches on a power switching circuit at zero-crossings of an AC power signal for each AC half-cycle and switches off the power switching circuit before zero-crossings of the AC power signal for each AC half-cycle; detecting for each AC half-cycle the voltage differential across the power switching circuit after the power switching circuit is switched off; detecting a difference between the detected voltage differential and the AC power signal, the difference arising from a characteristic of the lighting device and whether the lighting device is inductive or noninductive; amplifying the difference between the detected voltage differential and the AC power signal to provide an amplified signal; counting for each of a sequential preset plurality of AC half-cycles of the AC power signal the number of amplified signals oscillations that exceed the magnitude of selected threshold; and determining the lighting device is inductive if the number of amplified signals that exceed the magnitude of the selected threshold exceeds a preset plurality for every one of the sequential preset plurality of AC half-cycles; and resetting the phase dimming device if the lighting device is determined to be inductive to a mode that, when dimming, switches on the power switching circuit after a zero-crossing of an AC power signal for each AC half-cycles.

At least one embodiment further comprises the act of providing a resistive voltage divider across the power switching circuit for detecting the voltage differential across the power switching circuit. At least another embodiment further comprises the act of selecting a threshold above a magnitude of oscillations of the amplified signal produced if the lighting device is noninductive and below a magnitude of oscillations of the amplified signal produced if the lighting device is inductive.

At least one embodiment further comprises: providing a digital controller having a digital input port; setting the amplification of the difference between the detected voltage differential and the AC power signal so that the threshold coincides with a low to high transition level for the digital input port; coupling the amplified signal to a digital input port of a digital controller; and wherein the digital controller completes at least the counting, determining, and resetting steps.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein does not necessarily address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and sub-combinations. All such useful, novel, and inventive combinations and sub-combinations are contemplated herein, it being recognized that the explicit expression of each of these combinations is unnecessary.

BRIEF DESCRIPTION OF THE DRAWINGS

Some of the figures shown herein may include dimensions or may have been created from scaled drawings. However, such dimensions, or the relative scaling within a figure, are by way of example, and not to be construed as limiting.

DETAILED DESCRIPTION OF THE ILLUSTRATED EMBODIMENTS

For the purposes of promoting an understanding of the principles of the disclosure, reference will now be made to one or more embodiments, which may or may not be illustrated in the drawings, and specific language will be used to describe the same. It will nevertheless be understood that no limitation of the scope of the disclosure is thereby intended; any alterations and further modifications of the described or illustrated embodiments, and any further applications of the principles of the disclosure as illustrated herein are contemplated as would normally occur to one skilled in the art to which the disclosure relates. At least one embodiment of the disclosure is shown in great detail, although it will be apparent to those skilled in the relevant art that some features or some combinations of features may not be shown for the sake of clarity.

Figure 1:
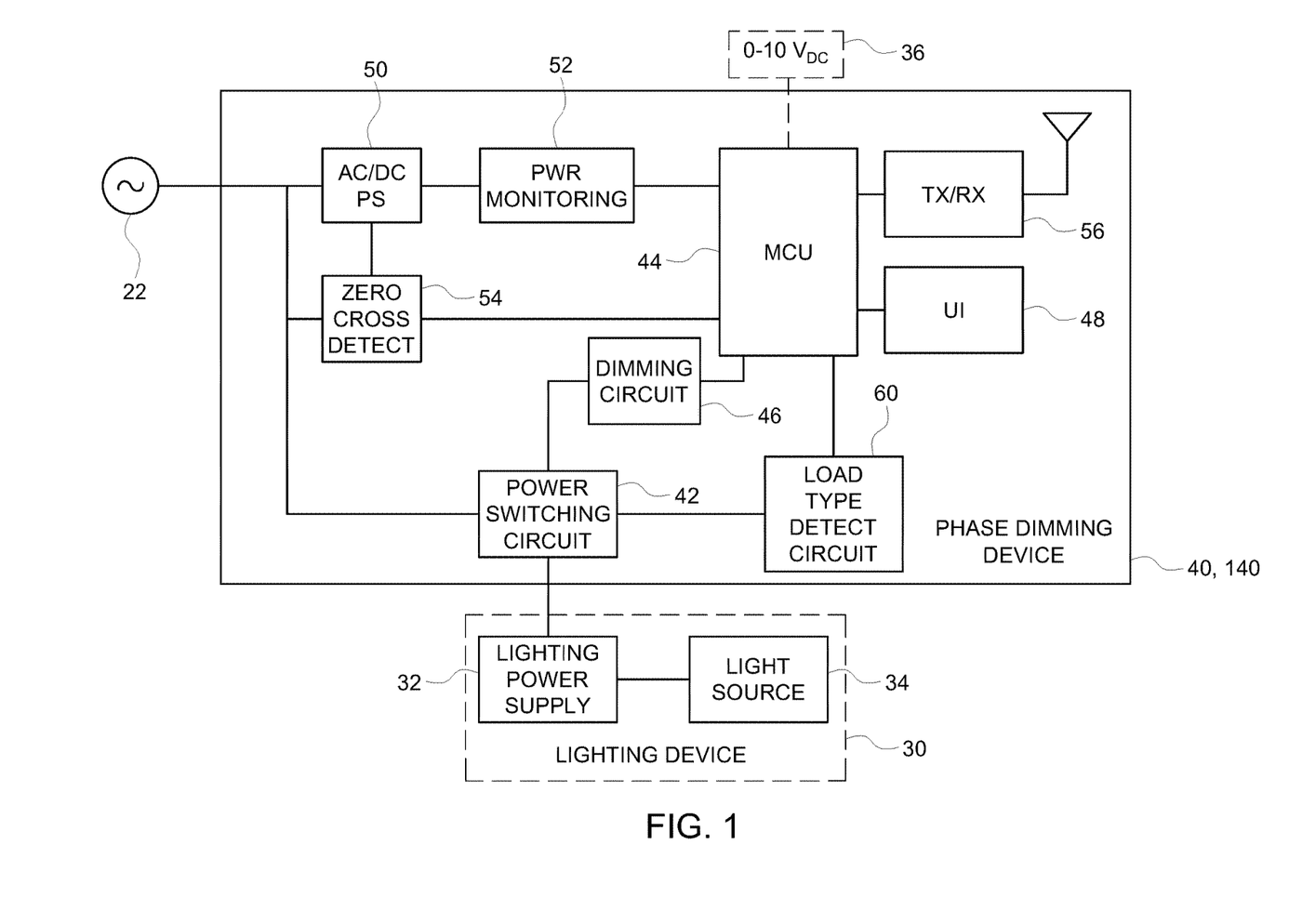
FIG. 1 illustrates an exemplary schematic block diagram of a phase dimming device and associated lighting device load according to embodiments of the present disclosure.
Figure 2:
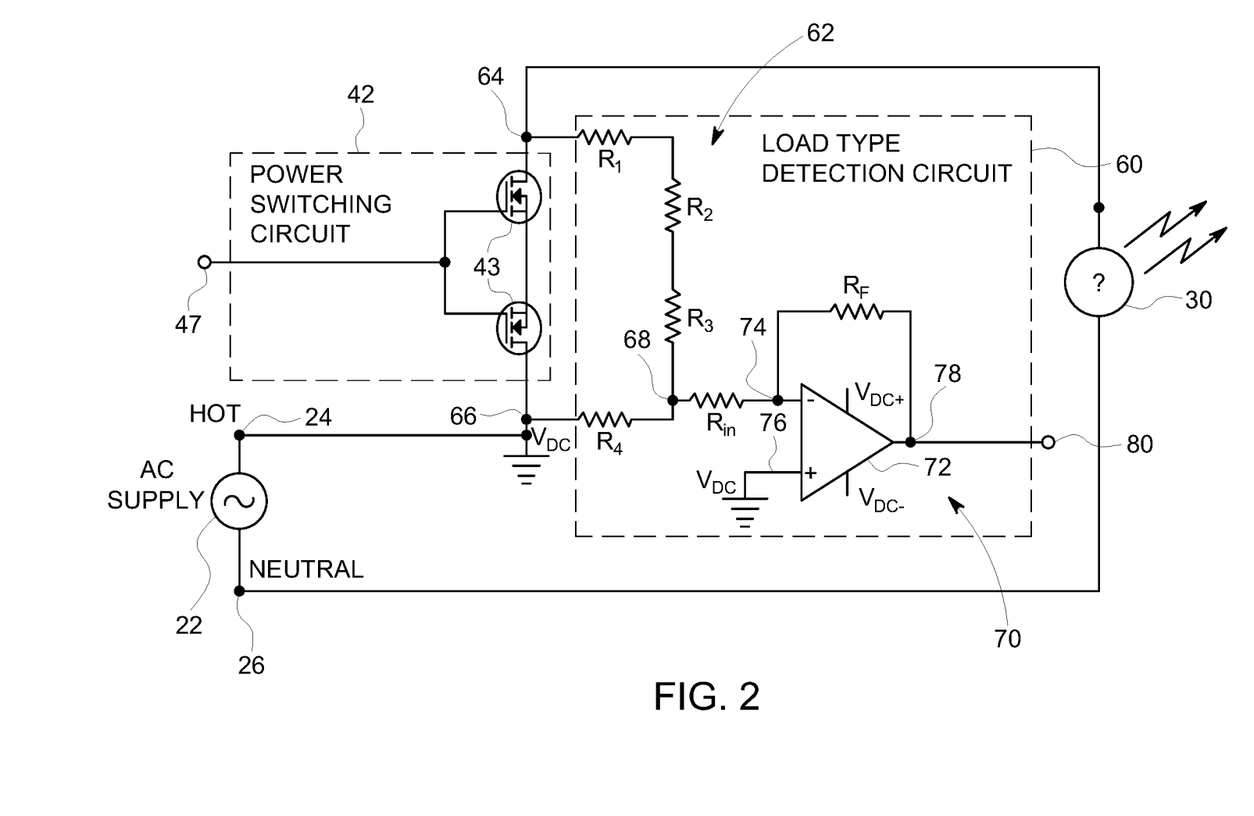
FIG. 2 illustrate exemplary load-type detection circuit and power switching circuit embodiments of the phase dimming device of FIG. 1.
Figure 6:
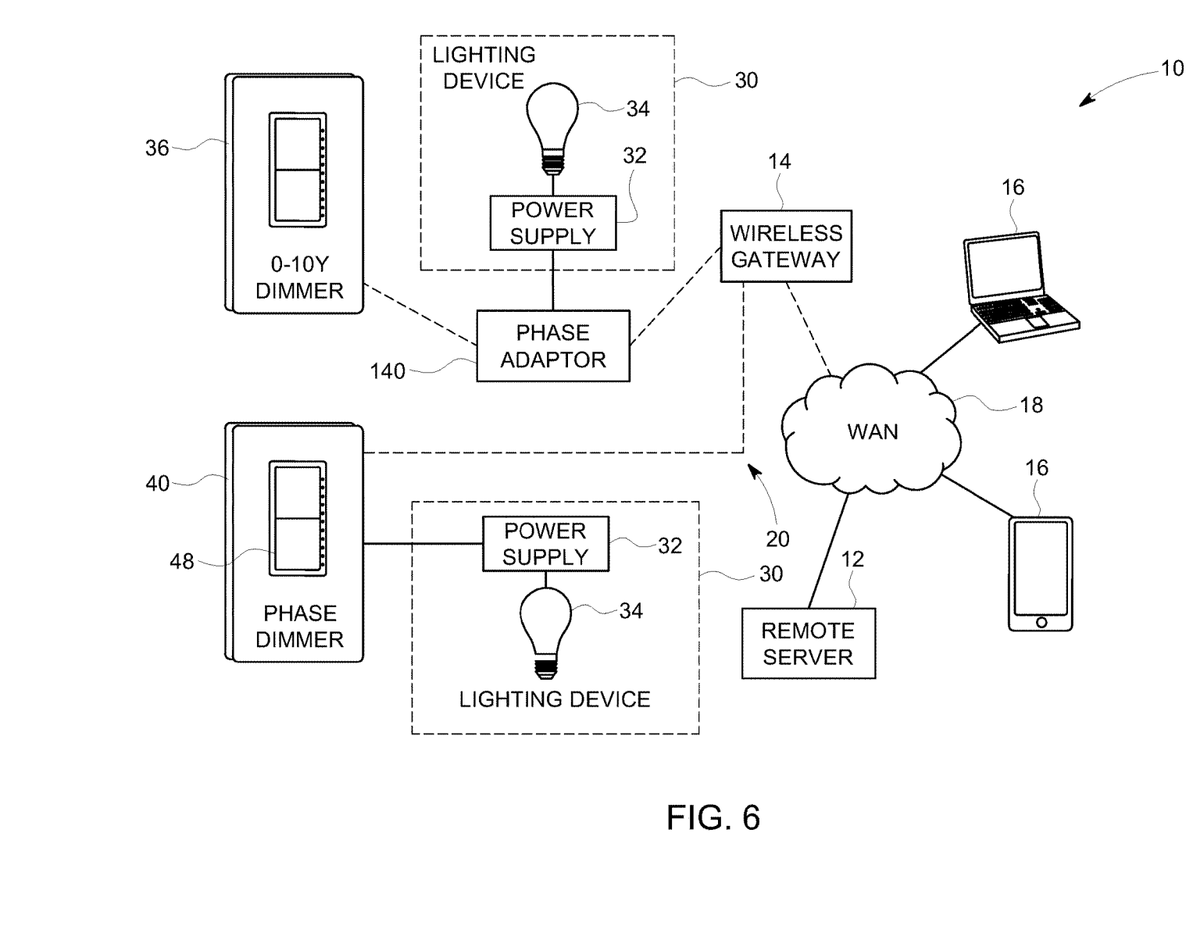
FIG. 6 illustrates an exemplary schematic block diagram of a wireless lighting control system incorporating the phase dimming device embodiments of FIGS. 1-2.

FIGS. 1 and 2 illustrate exemplary embodiments of phase dimming devices 40 and 140 for lighting devices 30, particularly for use with wireless lighting control system such as the exemplary wireless lighting control system 10 shown in FIG. 6. The phase dimming devices 40 and 140 according to this disclosure include a load-type detection circuit 60 for determining whether the load for a connected lighting device 30 has an inductive characteristic. Advantageously, the phase dimming devices 40 and 140 automatically detect the load characteristic and automatically set a phase-cut dimming mode to a preferred mode in response to the detected load characteristic. As will be discussed in more detail below, the phase dimming devices 40 and 140 also require minimal additional components to provide load-type detection beyond those components already included in typical phase dimming applications, particularly in a wireless lighting control environment, thereby minimizing cost. The disclosed solutions also have improved reliability by detecting multiple characteristics for each of a plurality of AC cycles in order to reliably distinguish between load types.

In some applications the phase-cut power signal is provided directly to the light source 34, for example, this is sometimes the case of incandescent lamps, and lighting device 30 may not include a lighting power supply 32. In many other applications, the phase-cut power signal provides power to a lighting power supply 32 from which the lighting source 34 is then powered. Type of lighting power supplies 32 include, for example, ballasts, LED drivers, Electronic Low Voltage (ELV), and Magnetic Low Voltage (MLV).

Embodiments of phase dimming device 40 typically include a user interface 48 for manually selecting a dimming illumination level of a lighting device 30 that requires power and dimming using AC phase dimming. In contrast, embodiments of phase dimming device 140 that typically omit a user interface 48 serve as an adaptor for receiving a 0-10 VDC dimming signal and for powering and dimming a lighting device 30 that requires AC phase dimming based on the received 0-10 VDC dimming signal.

Referring to FIG. 2, the power switching circuit 42 may include MOSFETS 43 or another type of electronic power switch for selectively switching on and off an AC power signal 22, as is well known in the art. For example, the hot AC line 24 which is coupled to the MOSFETS 43 at input node 66, is selectively conducted to output node 64. For example, a dimmer drive signal received at dimmer drive node 47 is provided by a dimming control circuit, including for example, an output port of a processor 44 (FIG. 1) (or another type of digital controller) and/or a discrete dimming circuit 46 (FIG. 1) to enable power switching circuit 42 to provide an AC phase-cut power signal at output node 64, which is coupled to the lighting device 30. Advantageously, the dimming control circuit can time the switching between the conducting and non-conducting state of the power switching circuit 42 relative to each half-cycle of the phase of the AC power signal 22 so that the mode of AC phase dimming provided can be selected to provide a preferred one of Forward Phase dimming or Reverse Phase dimming, for example, as discussed in the Background section above and as shown in an example of Reverse Phase dimming in FIG. 3A.

Figure 3A:
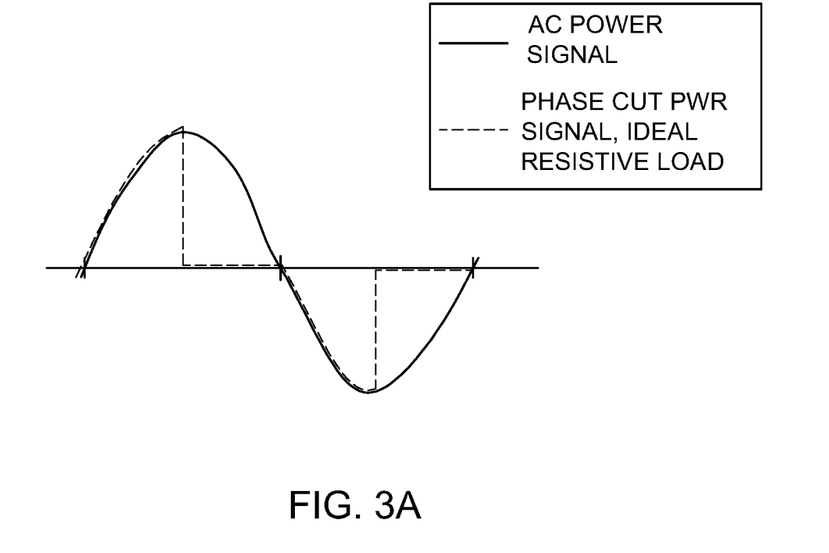
FIG. 3A illustrates an exemplary waveform diagram of an AC power signal and a phase-cut power signal resulting from an illustrative ideal resistive load according to embodiments of the present disclosure.
Figure 3B:
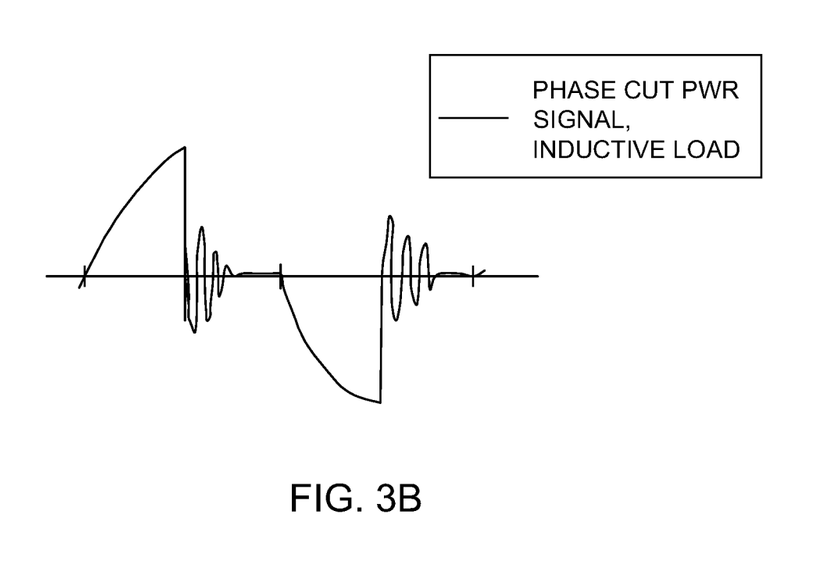
FIG. 3B illustrates an exemplary waveform diagram of a phase-cut power signal resulting from an illustrative inductive load according to embodiments of the present disclosure.
Figure 3C:
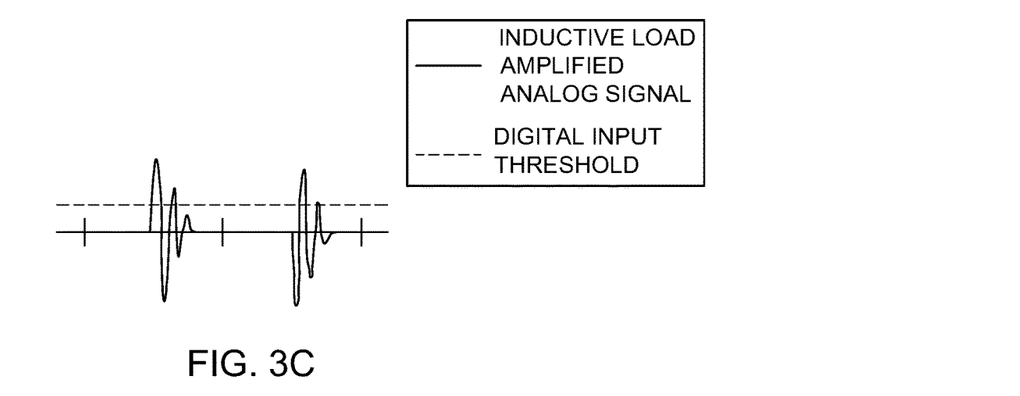
FIG. 3C illustrates an exemplary waveform diagram of an amplified analog signal resulting from an illustrative inductive load and an associated digital input threshold according to embodiments of the present disclosure.

An exemplary load-type detection circuit 60 includes a a resistive voltage divider network 62 coupled across input 66 and output node 64 of the power switching circuit 42. The exemplary network 62 includes 10 k ohm resisters R1, R2, and R3 and 22 ohm sensing resister R4, with the sensing node 68 located between R3 and R4. As shown in FIG. 2, the load-type detection circuit 60 also includes an amplifier circuit 70 that receives and amplifies an artifact signal. The artifact signal is measured across R4 and is therefore a proportion of the voltage difference between the AC power signal at input node 66 and the phase-cut power signal at output node 64, which is coupled to the lighting device 30. The artifact signal includes a signal component characteristic of whether the lighting device is inductive or noninductive upon the power switching circuit changing from the conductive state to the nonconductive state. For example, comparing the phase cut power signal for an illustrative ideal resistive load as shown in FIG. 3A to the phase cut power signal of an illustrative inductive load as shown in FIG. 3B, the ringing portion of the signal, as is separately illustrated in FIG. 3C, is the portion of the artifact signal produced from flyback of an inductive load upon the power switching circuit 42 being turned from on to off.

The exemplary amplifier circuit 70 uses an operational amplifier (op amp) 72 configured as an inverting amplifier. Input resistor Rin couples sensing node 68 to the inverting input node 74 of the op amp 72. The non-inverting input node 76 is coupled to the VDC ground for the amplifier circuit 70, which in the illustrative design is tied to hot AC line 24 at input node 66. A feedback resister Rf couples the inverting input node 74 and the amplifier output node 78, providing a gain of −Rf/Rin. The amplifier circuit 70 is thus configured to provide an analog output signal at an amplifier output node 78 based on an amplified difference between the artifact signal at node 68 and the AC power signal at node 66, the amplified difference being dependent on the signal component characteristic of the lighting device 30 and the gain of the amplifier circuit 70.

In the exemplary embodiments of the phase dimmer devices 40 and 140, advantageously, the analog output signal at amplifier output node 78 is coupled to a digital input port 80 of the control circuit, for example, processor 44 (FIG. 1). The digital input port 80 receiving the analog signal output registers the analog output as a high or low digital input, depending on the peak signal voltage of the analog signal output and the threshold voltage of the to register a low to high transition at digital input port 80. For example, for an illustrative processor 44 operating at 0-5 VDC, if the low to high transition for the digital input port 80 is 2.5 VDC, then if the analog signal output received from the amplifier circuit 70 transitions to a peak value of over 2.5

VDC, a high digital input will be sensed by the processor 44 at digital input port 80. For example, in an exemplary embodiment a gain of 10 is selected to set the above threshold related parameters and the gain is provided by a 1 megaohm resister Rf and a 100 kiloohm resister Rin.

It has been noted that even non-inductive type lighting devices 30 may produce some ringing at sensing node 68 upon an on to off switching transition of power switching circuit 42 occurring at portions of the AC phase other than zero-crossing, as illustrated in FIG. 3B; however, the present disclosure also notes that the amplitude and/or the number of ring cycles for non-inductive type lighting devices is lower than the amplitude and/or the number of ring cycles for inductive type lighting devices. By differentiating by both the amplitude of the ring cycles and the number of ring cycles for each AC phase half-cycle, processor 44 can differentiate between inductive type lighting devices 30 and non-inductive type lighting devices, particularly if the measurements are repeated across more than one AC phase half-cycle to reduce the likelihood of a false detection of an inductive lighting device due to noise or other non-repeating transients caused by something other than an inductive characteristic.

To differentiate inductive and non-inductive lighting devices based on the difference in amplitude of the artifact signal, the gain of the amplifier circuit 70 is set so that the typical minimum voltage magnitude for at least two or more oscillations of the amplified artifact signal for a lighting device 30 that is inductive is greater than the threshold low to high transition voltage for the digital input port 80 for processor 44, for example, greater than 2.5 VDC. In additional, the gain must also be set so that the typical maximum voltage magnitude for the same number of oscillations of the amplified signal produced if the lighting device is non-inductive is less than the same threshold, e.g. 2.5 VDC. By setting the gain of amplifier circuit 70 in this way, the processor will count rings from an inductive load and will not count rings from a non-inductive load.

Figure 3D:
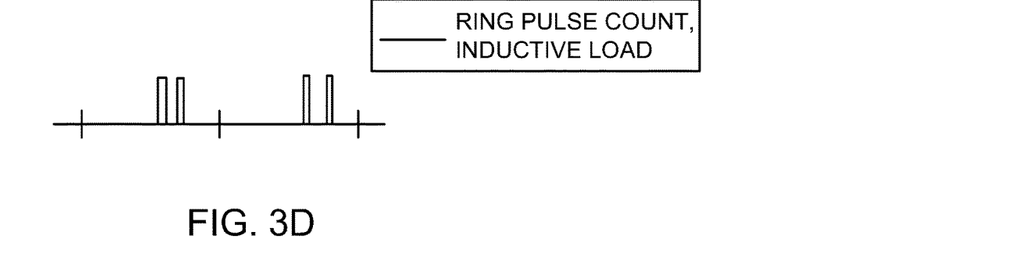
FIG. 3D illustrates an exemplary waveform diagram of a ring pulse count resulting from the illustrative signals and inductive load of FIG. 3C.

For example, FIGS. 3C-3F are illustrative of signal associated with a load-type detection circuit 60 and processor 44 of phase dimming device 40 and 140 for which the gain of amplifier circuit 70 is set to distinguish between inductive and non-inductive lighting devices 30. In this example, the processor 44 is configured to detect an inductive lighting device 30 if at least two rings are counted in the artifact signal for each of at least two sequential AC power signal half-cycles; however, more rings and/or more half-cycles could alternatively be used. FIG. 3C illustrates the gain is set so that for an inductive load at least the first two rings in each of at least two AC power signal half-cycle exceed the digital input threshold and thus, as shown in FIG. 3D, the digital input port 80 of processor 44 will count at least two low to high transitions (separated by high to low transitions) for each of the at least two AC power signal half-cycles (refer to FIG. 3A or 3B).

Figure 3E:
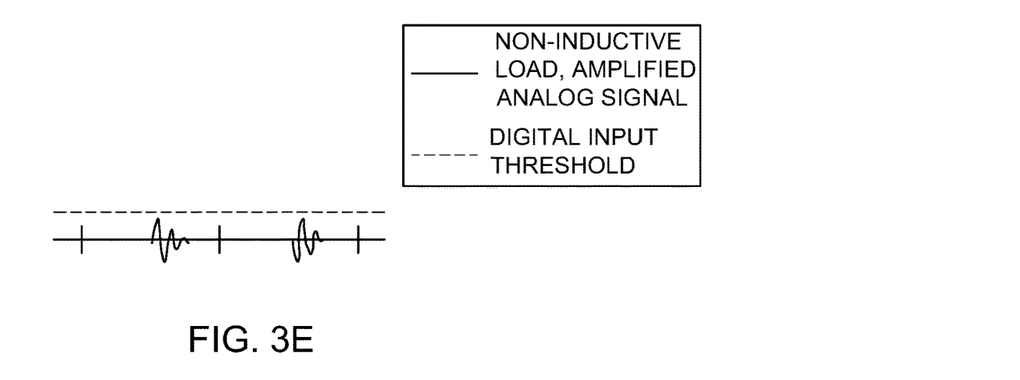
FIG. 3E illustrates an exemplary waveform diagram of an amplified analog signal resulting from an illustrative non-inductive load and an associated digital input threshold according to embodiments of the present disclosure.
Figure 3F:
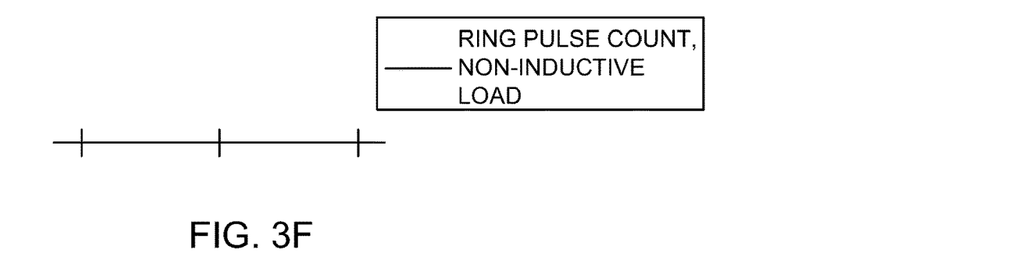
FIG. 3F illustrates an exemplary waveform diagram of a ring pulse count resulting from the illustrative signals and non-inductive load of FIG. 3E.

In contrast, as shown in FIG. 3E, the same gain results in a non-inductive load having fewer than two rings exceed the digital input threshold in each of the AC power signal half-cycles and thus, as shown in FIG. 3E, the digital input port 80 of processor 44 will count no low to high transitions for each of the at least two sequential AC power signal half-cycles. Even if a low to high transition is counted from a non-inductive lighting device 30, the processor 44 can be configured to detect the lighting device 30 as long as the minimum plurality of counts are not reached for every one of the minimum plurality of half-cycles for which counts are made, thereby reducing the likelihood of a false detection of an inductive lighting device 30. While sequential AC power signal half-cycles were selected, alternatively, nonsequential half-cycles could also be used in detecting the load-type.

Inductive lighting devices 30 produce more significant ringing when Reverse Phase dimming is used, so to maximize the difference in the artifact signal produced and measure between inductive and non-inductive lighting devices, the power switching circuit 42 is initially set for Reverse Phase dimming while the load-type is being detected. Upon completion of the load-type being detected, if an inductive lighting device 30 was detected, the power switching circuit 42 can be set to Forward Phase dimming, which is compatible with inductive loads. Additionally, because ringing occurs when the power switching circuit 42 is turned off at a point in the AC phase that is not at zero-crossing, at least some level of dimming must be set for load-type detection; however, the level of dimming set for load-type detection has not been found to be critical for the exemplary embodiments disclosed.

Referring to FIG. 1, embodiments of phase dimming device 40 and 140 all include a power switching circuit 42 and load-type detection circuit 60; however, they may selectively include other components shown in FIG. 1 depending on the application. For example, a wall dimmer switch embodiment of phase dimming device 40 will include a user interface 48, for example, a dim up, dim down, and optionally other user switches; however, a 0-10 VDC adaptor embodiment of phase dimming device 40 may or may not include a user interface 48, but does include a circuit component, for example, processor 44, for receiving the 0-10 VDC dimming signal. At least one exemplary embodiment of phase dimming device 40 is powered by AC power signal 22 and includes an AC/DC power supply 50, for example, providing 5 VDC to power select other electrical components, including for example, processor 44. The embodiment also includes power monitoring 52, which can, for example, provide energy use information, detect an impending loss of power, and/or may include a zero-cross detection circuit used for power switching circuit 42 and for load-type detection, or the zero-cross detection circuit 54 may be provided as a separate device or circuit. Additionally, for use in a wireless lighting control system 10 (FIG. 6), the embodiment may also include a wireless receiver/transmitter (radio) 56 for communicating status and/or receiving power dimming commands for controlling lighting device 30. For example, processor 44 may transmit and receive data via the wireless receiver/transmitter 56 based on the processor's detection and/or control of other components of the phase dimming device.

Advantageously, applications of phase dimming devices 40 and 140 for use with wireless lighting control systems will already have a digital controller such as a processor 44, and even some phase dimming devices for other uses may also include a digital controller. By using such a preexisting digital controller to control the process of detecting the load-type and setting the mode of the phase dimming used, and also using a digital input port 80 as part of the load-type detection circuit, the automatic load-type detection functionality and automatic phase mode-type setting can be provided with minimal and inexpensive additional components, for example, as shown in FIG. 2 and discussed above.

Figure 4:
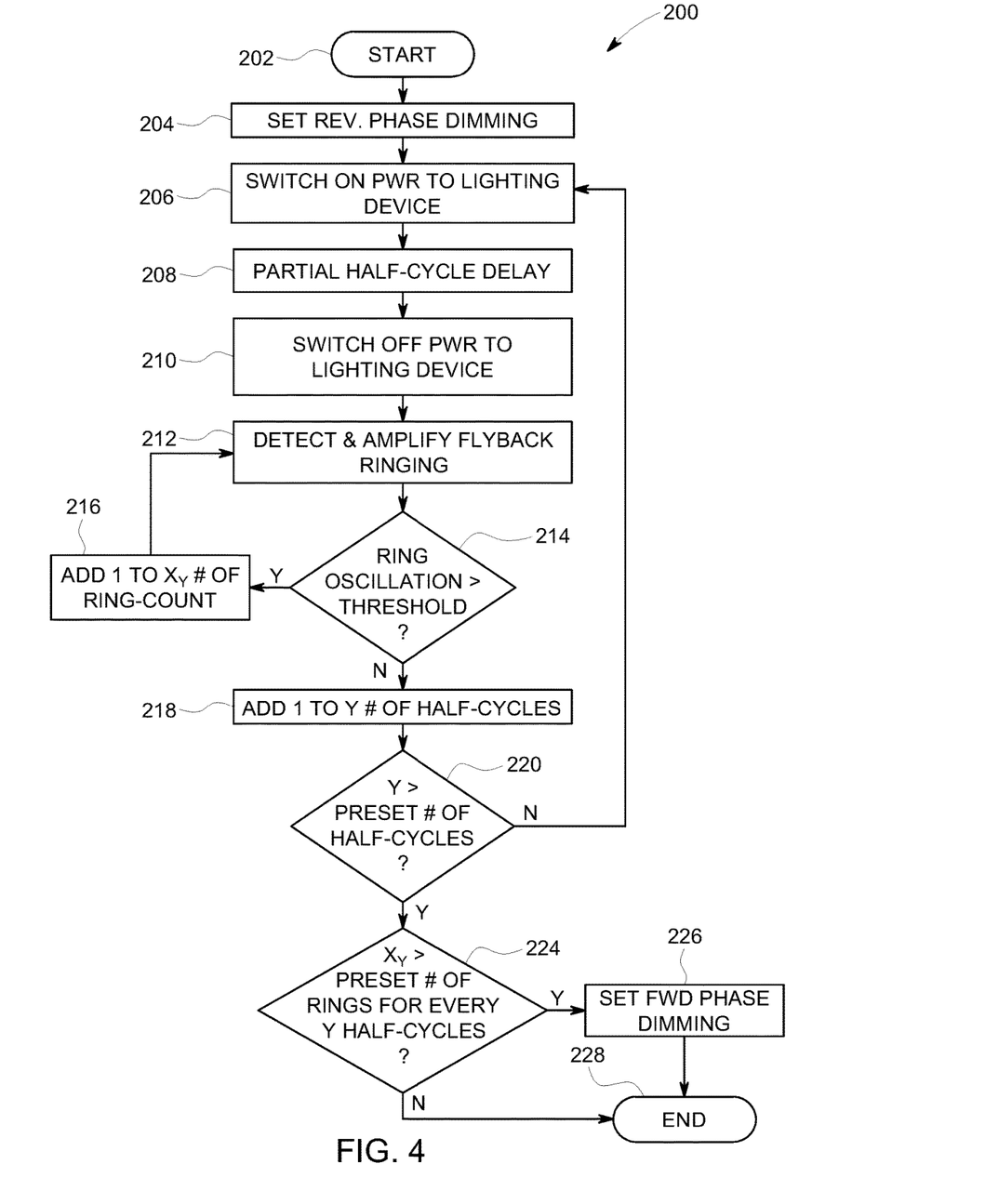
FIG. 4 illustrates an exemplary process for detecting a lighting device load-type and setting a phase dimming mode associated with the phase dimming device embodiments of FIGS. 1-2.

FIG. 4 is a flow chart for an exemplary process 200 for determining whether a lighting device 30 coupled to a phase dimming device 40, 140 is inductive on noninductive and setting a phase mode type accordingly. At step 202 the process starts. At step 204, processor 44 sets power switching circuit 42 for reverse phase dimming. At step 206, processor 44 verifies that a partial dimming level is set, resetting the dimming level if required, and sets the power switching circuit 42 to a conducting state, providing an AC phase cut signal to lighting device 30.

At step 208, the processor 44 delays from AC power signal zero-crossing until some time prior to the next zero-crossing of the AC power signal, based on the dimming level set. At step 210, processor 44 and/or the dimming circuit 46 switches the power switching circuit 42 to a non-conducting state, cutting-off power to the lighting device 30 for the remaining portion of the AC power signal half-cycle, for example, as illustrated in FIG. 3A.

At step 212, the load-type detection circuit 60 detects and amplifies the artifact signal, coupling the signal to digital input port 80 of processor 44. At step 214, if required for processor 44 configuration, the digital input port 80 is pulled low (reset). Then, after a preset period of delay, for example to account for the ring interval, processor 44 determines whether the digital input port 80 has transitioned from low to high indicating a potential flyback ring oscillation of sufficient magnitude to likely be from an inductive characteristic of the lighting device 30. If so, then process 200 continues at step 216 and a ring count X for half-cycle Y is incremented by one count. Process 200 then returns to step 212.

If at step 214 a low to high transition is not detected at digital input port 80, then process 200 continues at step 218. At step 218, the count of half-cycles Y is incremented by one count. At step 220, if the count of half-cycles Y is equal to or greater than a preset number of half-cycles to be used for load-type detection, for example, two, then the process 200 continues at step 224, else the process returns to step 206 to continue detection for another AC half-cycle.

At step 224, processor 44 determines whether X, the number of flyback ring oscillations counted for each half-cycle Y, is equal or greater than a preset number of rings, for example two, for each and every half-cycle Y counted. If so, then an inductive type lighting device 30 has been detected and the process continues at step 226, in which processor 44 resets the phase mode type to forward phase dimming for that lighting device. If not, then process 200 ends at step 228 with reverse phase dimming set for the lighting device 30, which is detected to be a non-inductive type lighting device.

Figure 5:
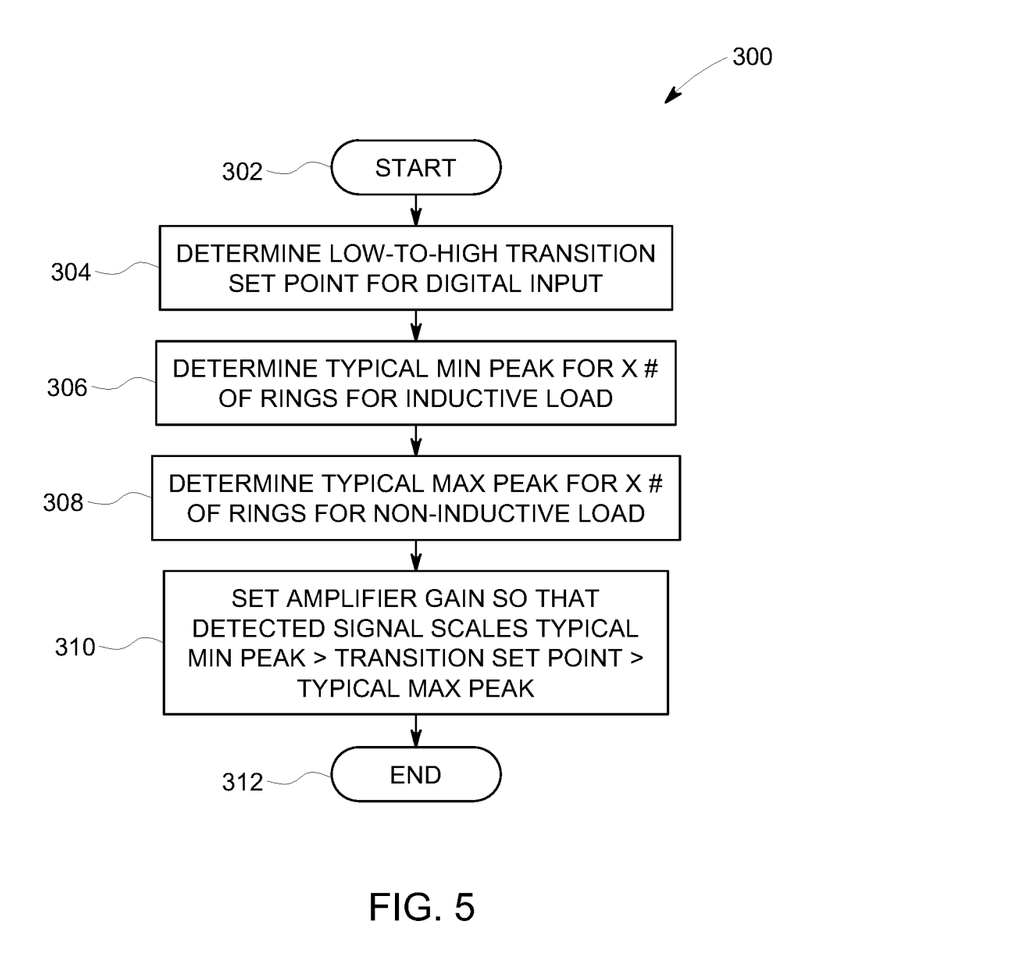
FIG. 5 illustrates an exemplary process for setting an amplifier gain associated with the load-type detection circuit of FIG. 2.

FIG. 5 is a flow chart for an exemplary process 300 for selecting an amplifier gain that provides low to high transitions at a digital input port 80 of processor 44 when the lighting device 30 is an inductive type. At step 302 the process 300 starts. At step 304, the low to high transition voltage set point is determined for the digital input port 80 by reference to the data sheet for the processor 44. For example, in the exemplary embodiment of the phase dimming device 40, 140, the transition voltage is 2.5 VDC. At step 306, a typical minimum peak voltage is determined, for example, by calculation or testing as is known in the art, for the artifact signal at sensing node 68 for the first preset number of oscillations X to be detected after switching off of power switching circuit 42 for an inductive type load. At step 308, a typical maximum peak voltage is determined, for example, by calculation or testing as is known in the art, for the artifact signal at sensing node 68 for the first preset number of oscillations X to be detected after switching off of power switching circuit 42 for a non-inductive type load.

At step 310, an amplifier gain is selected that scales the minimum peak voltage determined in step 306 and the maximum peak voltage in step 308 so that the low to high threshold transition voltage determined in step 304 is between the two voltages, thereby typically detecting and counting all first preset number of ring oscillations X at digital input port 80 for inductive type lighting devices 30 and not detecting and not counting any first preset number of ring oscillations X at digital input port 80 for non-inductive type lighting devices 30. At step 312 the process 300 is complete.

Referring to FIG. 6, exemplary embodiments of phase dimmer devices 40 and 140 may be configured for use with an exemplary wireless lighting system 10, which may include a remote server 12, wireless gateway 14, wide area network (WAN) 18, communication/computing devices 16, wireless network 20, lighting devices 30, and other lighting and lighting control devices (not shown). Such an exemplary system 10 is disclosed in U.S. Pat. No. 10,085,328, Wireless Lighting Control Systems and Methods, issued Sep. 25, 2018, and assigned to the present application, the entirety of which is hereby incorporated herein by reference. As shown in FIG. 6, one or both of phase dimmer devices 40 and 140 may communicate over wireless network 20 with a wireless gateway 14, and may further communicate via wireless gateway 14 with remote server 12 and/or communication/computing devices 16, advantageously providing both local manual control and remote manual monitoring and/or control of phase dimming devices 40 and associated lighting devices 30, including, for example, utilized scheduled lighting scenes, automations, and the like.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims. Reference systems that may be used herein can refer generally to various directions (e.g., upper, lower, forward and rearward), which are merely offered to assist the reader in understanding the various embodiments of the disclosure and are not to be interpreted as limiting.

While examples, one or more representative embodiments and specific forms of the disclosure have been illustrated and described in detail in the drawings and foregoing description, the same is to be considered as illustrative and not restrictive or limiting. The description of particular features in one embodiment does not imply that those particular features are necessarily limited to that one embodiment. Some or all of the features of one embodiment can be used in combination with some or all of the features of other embodiments as would be understood by one of ordinary skill in the art, whether or not explicitly described as such. One or more exemplary embodiments have been shown and described, and all changes and modifications that come within the spirit of the disclosure are desired to be protected.

Any reference to "invention" within this document is a reference to an embodiment of a family of inventions, with no single embodiment including features that are necessarily included in all embodiments, unless otherwise stated. Furthermore, although there may be references to benefits or advantages provided by some embodiments, other embodiments may not include those same benefits or advantages, or may include different benefits or advantages. Any benefits or advantages described herein are not to be construed as limiting to any of the claims.

Likewise, there may be discussion with regards to "objects" associated with some embodiments of the present invention, it is understood that yet other embodiments may not be associated with those same objects, or may include yet different objects. Any advantages, objects, or similar words used herein are not to be construed as limiting to any of the claims. The usage of words indicating preference, such as "preferably," refers to features and aspects that are present in at least one embodiment, but which are optional for some embodiments.

Specific quantities (spatial dimensions, temperatures, pressures, times, force, resistance, current, voltage, concentrations, wavelengths, frequencies, heat transfer coefficients, dimensionless parameters, etc.) may be used explicitly or implicitly herein, such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

ELEMENT NUMBERING

The following is a list of element numbers and descriptors, which are also understood in the context of this disclosure in its entirety.

| No. | Description |
| --- | --- |
| 10 | wireless lighting control system |
| 12 | remote server |
| 14 | wireless gateway |
| 16 | comm./computing device |
| 18 | wide area network |
| 20 | local wireless network |
| 22 | AC power signal |
| 24 | hot AC line |
| 26 | neutral AC line |
| 30 | lighting device |
| 31 | lighting power supply |
| 34 | light source |
| 36 | 0-10 V DC dimmer |
| 40 | phase dimming device |
| 42 | power switching circuit |
| 43 | electronic switch |
| 44 | processor |
| 46 | dimming circuit |
| 47 | dimmer drive node |
| 48 | user interface |
| 50 | AC/DC power supply |
| 52 | power monitoring |
| 54 | zero cross detector |
| 56 | wireless receiver/transmitter |
| 60 | load-type detection circuit |
| 62 | resistive voltage divider (R1-R4) |
| 64 | output node |
| 66 | input node |
| 68 | sensing node |
| 70 | amplifier circuit |
| 72 | op amp |
| Rin | input resister |
| Rf | feedback resister |
| 74 | inverting input node |
| 76 | noninverting input node |
| 78 | amplifier output node |
| 80 | digital input port |
| 140 | phase dimming adaptor |

What is claimed is:

1. A phase dimming device for converting an AC power signal to a phase-cut power signal for selectively powering a lighting device that may be inductive or non-inductive, comprising:
a power switching circuit having an input node and an output node, the input node receiving the AC power signal, the power switching circuit having a conductive state for a first portion of each AC half-cycle in which the AC power signal is conducted to the output node, and the power switching circuit having a nonconductive state for a second portion of each AC half-cycle in which the AC power signal is not conducted to the output node, and the output node coupled to the lighting device, thereby coupling the resulting phase-cut power signal to the lighting device;
a resistive voltage divider coupled across the input and output nodes of the power switching circuit, the resistive voltage divider having a sensing node providing a artifact signal formed by the difference between the AC power signal and the phase-cut power signal coupled to the lighting device, the artifact signal having a signal component characteristic of whether the lighting device is inductive or noninductive upon the power switching circuit changing from the conductive state to the nonconductive state;
an amplifier circuit receiving the artifact signal and configured to provide an analog output signal at an amplifier output node based on an amplified difference between the artifact signal and the AC power signal, the amplified difference being dependent on the signal component characteristic of the lighting device and a gain of the amplifier circuit; and
a control circuit having a digital input port coupled to the amplifier output node, the digital input port receiving the analog signal output and registering the analog output as a high or low digital input; and
wherein:
the control circuit is configured to count the number of low to high digital input transitions for each AC power signal half-cycles; and
the control circuit is configured to determine the lighting device to be inductive if at least a preset plurality of low to high digital input transitions are counted for every one of at least a preset plurality of sequential AC power signal half-cycles.

2. The phase dimming device of claim 1, wherein the control circuit is configured to initially set the power switching circuit for Reverse Phase dimming, and to reset the power switching circuit for Forward Phase dimming upon determining the lighting device to be inductive.

3. The phase dimming device of claim 2, wherein a gain of the amplifier circuit is set to provide an analog output magnitude sufficient to register a low to high digital input transition from the signal component characteristic of the lighting device when the lighting device is inductive and to not register a low to high digital input transition from the signal component characteristic of the lighting device when the lighting device is non-inductive.

4. The dimming device of claim 1, wherein the amplifier circuit is configured as an inverting op amp.

5. The phase dimming device of claim 1, wherein the preset plurality of low to high digital input transitions is equal to two and the preset plurality of sequential AC power signal half-cycles is equal to two.

6. The phase dimming device of claim 1, further comprising a user interface coupled to the dimming control circuit for manual control of the dimming level of the lighting device.

7. The phase dimmer device of claim 1, wherein the control circuit is configured to receive a 0-10V dimming command signal and set the dimming level for the power switching circuit proportional to the dimming command signal.

8. The phase dimming device of claim 1, further comprises a radio transceiver for communicating with a wireless lighting control system and wherein the dimming control circuit is a microcontroller providing communication with the radio transceiver and responsive to dimming commands received from the wireless lighting control system.

9. The phase dimming device of claim 8, further comprising a user interface coupled to the microcontroller for manual control of the dimming level of the lighting device.

10. The phase dimming device of claim 8, wherein the microcontroller reports to the wireless lighting control system whether the lighting device is determined to be inductive or non-inductive.

11. A method of determining whether a lighting device coupled to a phase dimming device is inductive on noninductive, the method comprising the acts of:
    setting the phase dimming device to a mode that, when dimming, switches on a power switching circuit at zero-crossings of an AC power signal for each AC half-cycle and switches off the power switching circuit before zero-crossings of the AC power signal for each AC half-cycle;
    detecting for each AC half-cycle the voltage differential across the power switching circuit after the power switching circuit is switched off;
    detecting a difference between the detected voltage differential and the AC power signal, the difference arising from a characteristic of the lighting device and whether the lighting device is inductive or noninductive;
    amplifying the difference between the detected voltage differential and the AC power signal to provide an amplified signal;
    counting for each of a sequential preset plurality of AC half-cycles of the AC power signal the number of amplified signals oscillations that exceed the magnitude of selected threshold; and
    determining the lighting device is inductive if the number of amplified signals that exceed the magnitude of the selected threshold exceeds a preset plurality for every one of the sequential preset plurality of AC half-cycles; and
    resetting the phase dimming device if the lighting device is determined to be inductive to a mode that, when dimming, switches on the power switching circuit after a zero-crossing of an AC power signal for each AC half-cycles.

12. The method of claim 1, further comprising the act of providing a resistive voltage divider across the power switching circuit for detecting the voltage differential across the power switching circuit.

13. The method of claim 11, further comprising the act of selecting a threshold above a magnitude of oscillations of the amplified signal produced if the lighting device is noninductive and below a magnitude of oscillations of the amplified signal produced if the lighting device is inductive.

14. The method of claim 11, further comprising:
    providing a digital controller having a digital input port;
    setting the amplification of the difference between the detected voltage differential and the AC power signal so that the threshold coincides with a low to high transition level for the digital input port;
    coupling the amplified signal to a digital input port of a digital controller; and
    wherein the digital controller completes at least the counting, determining, and resetting steps.

* * * * *